(12) United States Patent
Noh et al.

(10) Patent No.: US 10,586,306 B2
(45) Date of Patent: Mar. 10, 2020

(54) IMMERSIVE DISPLAY APPARATUS AND METHOD FOR CREATION OF PERIPHERAL VIEW CORRESPONDING TO INPUT VIDEO

(71) Applicant: KOREA ADVANCED INSTITUTE OF SCIENCE AND TECHNOLOGY, Daejeon (KR)

(72) Inventors: Junyong Noh, Daejeon (KR); Sangwoo Lee, Daejeon (KR); Jungjin Lee, Daejeon (KR); Kyehyun Kim, Daejeon (KR); Bumki Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/648,030

(22) Filed: Jul. 12, 2017

(65) Prior Publication Data
US 2018/0286013 A1 Oct. 4, 2018

(30) Foreign Application Priority Data
Mar. 31, 2017 (KR) .......................... 10-2017-0041918

(51) Int. Cl.
*G06K 9/46* (2006.01)
*G06T 3/00* (2006.01)
(Continued)

(52) U.S. Cl.
CPC .......... *G06T 3/0093* (2013.01); *G06F 3/1423* (2013.01); *G06F 3/1446* (2013.01);
(Continued)

(58) Field of Classification Search
None
See application file for complete search history.

(56) References Cited

U.S. PATENT DOCUMENTS 6,393,162 B1 * 5/2002 Higurashi ............... G06T 5/006
345/629
2011/0255592 A1 * 10/2011 Sung .................... H04N 19/597
375/240.02
(Continued)

FOREIGN PATENT DOCUMENTS

JP 2014-509759 4/2014
KR 10-2011-0088515 8/2011
(Continued)

OTHER PUBLICATIONS

Sang Youn Kim et al., "Immersive Multichannel Display for Virtual Reality", *Digital Industrial Information*, vol. 6, No. 3 (Sep. 2010) pp. 131-139.

*Primary Examiner* — Xiao M Wu
*Assistant Examiner* — Steven Z Elbinger

(57) ABSTRACT

The present disclosure relates to an immersive display apparatus and method for creation of a peripheral view image corresponding to an input video, the method comprising a pre-processing step of obtaining scene-space information at a main-view video signal corresponding to a first area, a pre-warping step of performing first warping to at least one neighborhood frame corresponding to a target frame included in the pro-processed video signal and determining an outlier from the result of the first warping, a sampling step of sampling at least one neighborhood frame to be used for extrapolation from the result of the first warping, a warping step of performing second warping to the sampled frame except for the outlier to generate a peripheral view image signal corresponding to a second area around the first area, and a blending step of blending the peripheral view image signal to the main-view video signal.

20 Claims, 12 Drawing Sheets

(51) Int. Cl.
*G06F 3/14* (2006.01)
*G06F 3/01* (2006.01)

(52) U.S. Cl.
CPC ............... *G06K 9/46* (2013.01); *G06T 3/005* (2013.01); *G06F 3/011* (2013.01); *G06T 2207/10016* (2013.01); *G06T 2207/20221* (2013.01)

(56) References Cited

U.S. PATENT DOCUMENTS

| | | | |
|---|---|---|---|
| 2012/0223885 A1* | 9/2012 | Perez | G06F 3/011 345/158 |
| 2013/0163896 A1* | 6/2013 | Chen | G06T 3/0068 382/278 |
| 2013/0287304 A1* | 10/2013 | Kimura | G06T 7/0028 382/199 |
| 2014/0118482 A1* | 5/2014 | Noh | H04N 5/23238 348/36 |
| 2017/0202449 A1* | 7/2017 | Imamura | A61B 3/0025 |
| 2017/0244895 A1* | 8/2017 | Zilberman | G06T 7/337 |

FOREIGN PATENT DOCUMENTS

| | | |
|---|---|---|
| KR | 10-2015-0038954 | 4/2015 |
| KR | 10-2017-0027002 | 3/2017 |
| WO | WO 2012-118769 | 9/2014 |

\* cited by examiner

| | Prewarping |
|---|---|
| (1) | $E_d = \sum_k \left\| \sum_{j \in f(p_t^k)} \omega_t^j \hat{v}_t^j - p_{target}^k \right\|^2$ |
| (2) | $E_s = \sum_f \left\| \hat{v}_t^{f1} - (\hat{v}_t^{f2} + u(\hat{v}_t^{f3} - \hat{v}_t^{f2}) + vR_{90}(\hat{v}_t^{f3} - \hat{v}_t^{f2})) \right\|^2$ |
| (3) | $\arg\min_{\hat{v}_t} E_d + \lambda_s E_s$ |

FIG. 11

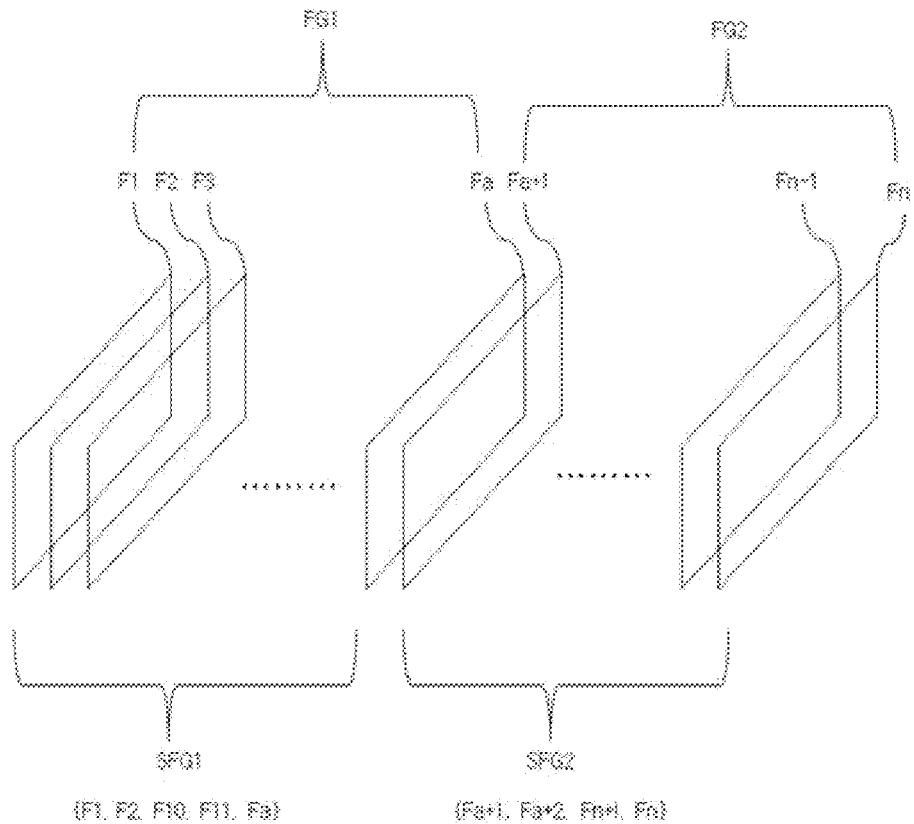

FIG. 12

| | Warping |
|---|---|
| (4) | $E_i = \sum_k \left\| \sum_{j \in f(p_t^k)} \omega_t^j \hat{v}_t^j - \sum_{j \in f(p_{t-1}^k)} \omega_{t-1}^j \hat{v}_{t-1}^j \right\|^2$ |
| (5) | $E_{tf} = \left\| \sum_{\hat{v}^j \in \hat{V}_{target}} \hat{v}^j - v^j \right\|^2$ |
| (6) | $E_c = \sum_f \left\| \hat{v}_t^{f1} - (\hat{v}_t^{f2} + \tilde{u}(\hat{v}_t^{f3} - \hat{v}_t^{f2}) + \tilde{v}R_{90}(\hat{v}_t^{f3} - \hat{v}_t^{f2})) \right\|^2$ |
| (7) | $\arg\min_{\hat{v}_t} \sum_{t \in I''} E_d + \lambda_s E_s + \lambda_i E_i + \lambda_{tf} E_{tf} + \lambda_c E_c$ |

IMMERSIVE DISPLAY APPARATUS AND METHOD FOR CREATION OF PERIPHERAL VIEW CORRESPONDING TO INPUT VIDEO

CROSS-REFERENCE TO RELATED APPLICATION

This application claims priority of Korean Patent Application No. 10-2017-0041918, filed on Mar. 31, 2017, in the KIPO (Korean Intellectual Property Office), the disclosure of which is incorporated herein entirely by reference.

BACKGROUND OF THE INVENTION

Field of the Invention

This disclosure is directed to providing an immersive display apparatus and method for creation of a peripheral view image from a video signal with a narrow view angle in order to generate an image with a wide view angle by processing a video signal with a narrow view angle.

Description of the Related Art

An immersive display apparatus provides a wider view angle to a user in comparison to an existing display apparatus so that the user may be immersed in a video more deeply.

For example, in an existing immersive display apparatus, a plurality of cameras for providing a video of a wider view angle are used to photograph a video at various angles, and then the photographed videos are combined.

However, using a plurality of cameras increases costs, and the amount of data to be process may increase excessively.

In another example, in an existing immersive display apparatus, a camera having a large photographing angle may be used to make an image.

In this case, the image may have lowered resolution.

SUMMARY OF THE INVENTION

This disclosure is directed to providing an immersive display apparatus and method for creation of a peripheral view image from a video signal with a narrow view angle in order to generate an image with a wide view angle by processing a video signal with a narrow view angle In one general aspect of the present disclosure, there is provided an immersive display method for creation of a peripheral view image corresponding to an input video, comprising: a pre-processing step of obtaining scene-space information at a main-view video signal corresponding to a first area; a pre-warping step of performing first warping to at least one neighborhood frame corresponding to a target frame included in the pro-processed video signal and determining an outlier from the result of the first warping; a sampling step of sampling at least one neighborhood frame to be used for extrapolation from the result of the first warping; a warping step of performing second warping to the sampled frame except for the outlier to generate a peripheral view image signal corresponding to a second area around the first area; and a blending step of blending the peripheral view image signal to the main-view video signal.

In addition, the scene-space information may include scene point information and camera parameter information.

In addition, the neighborhood frame and the target frame may be included in the same shot.

In addition, frames sampled corresponding to all target frames of a frame group included in the same shot may be identical to each other.

In addition, each frame included in the frame group may be a target frame.

In addition, assuming that a scene point on the neighborhood frame corresponding to a first scene point on the target frame is called a second scene point and a scene point obtained by performing the first warping to the second scene point is a second warping scene point, in the pre-warping step, the second scene point may be set as an outlier when a distance between the first scene point and the second warping scene point is greater than a preset reference distance.

In addition, the sampled frame may include a portion not overlapping with the target frame.

In addition, in the blending step, the peripheral view image signal may be blended to the main-view video signal in the order closer to the main-view video image with respect to the target frame.

In addition, a resolution corresponding to the main-view video signal may be identical to a resolution corresponding to the peripheral view image signal.

In another aspect of the present disclosure, there is provided an immersive display apparatus for creation of a peripheral view image corresponding to an input video, comprising: a display part configured to display an image; a pre-processing part configured to obtain scene-space information from a main-view video signal corresponding to a first area of the display part; a pre-warping part configured to perform first warping to at least one neighborhood frame corresponding to a target frame included in the video signal pro-processed by the pre-processing part and determine an outlier from the result of the first warping; a sampling part configured to sample at least one neighborhood frame to be used for extrapolation from the result of the first warping; a warping part configured to perform second warping to the sampled frame except for the outlier to generate a peripheral view image signal corresponding to a second area around the first area of the display part; and a blending part configured to blend the peripheral view image signal to the main-view video signal.

In addition, the scene-space information may include scene point information and camera parameter information.

In addition, the neighborhood frame and the target frame may be included in the same shot.

In addition, frames sampled corresponding to all target frames of a frame group, which has a plurality of frames, included in the same shot may be identical to each other.

In addition, each frame included in the frame group may be a target frame.

In addition, assuming that a scene point on the neighborhood frame corresponding to a first scene point on the target frame is called a second scene point and a scene point obtained by performing the first warping to the second scene point is a second warping scene point, the pre-warping part may set the second scene point as an outlier when a distance between the first scene point and the second warping scene point is greater than a preset reference distance.

In addition, the sampled frame may include a portion not overlapping with the target frame.

In addition, the blending part may blend the peripheral view image signal to the main-view video signal in the order closer to the main-view video image with respect to the target frame.

In addition, a resolution corresponding to the main-view video signal may be identical to a resolution corresponding to the peripheral view image signal.

In another aspect of the present disclosure, there is provided an immersive display apparatus for creation of a peripheral view image corresponding to an input video, comprising: a first display part including a first display area; a second display part including a second display area; a pre-processing part configured to obtain scene-space information from a main-view video signal corresponding to the first display part; a pre-warping part configured to perform first warping to at least one neighborhood frame corresponding to a target frame included in the video signal pre-processed by the pre-processing part and determine an outlier from the result of the first warping; a sampling part configured to sample at least one neighborhood frame to be used for extrapolation from the result of the first warping; a warping part configured to perform second warping to the sampled frame except for the outlier to generate a peripheral view image signal corresponding to the second display part; and a blending part configured to blend the peripheral view image signal to the main-view video signal.

In addition, the scene-space information may include scene point information and camera parameter information.

The immersive display apparatus and method for creation of a peripheral view image according to the present disclosure generates a peripheral view image corresponding to a target frame by using video information of a peripheral frame adjacent to the target frame of an input video signal, thereby preventing deterioration of resolution of the peripheral view image.

In addition, the immersive display apparatus and method for creation of a peripheral view image according to the present disclosure may reduce time required for processing data.

Moreover, the immersive display apparatus and method for creation of a peripheral view image according to the present disclosure may suppress distortion of the peripheral view image.

BRIEF DESCRIPTION OF THE DRAWINGS

The above and other features and advantages will become more apparent to those of ordinary skill in the art by describing in detail exemplary embodiments with reference to the attached drawings, in which:

FIGS. 4 to 18 are diagrams for illustrating an immersive display method for creation of a peripheral view image according to the present disclosure.

In the following description, the same or similar elements are labeled with the same or similar reference numbers.

DETAILED DESCRIPTION

Figure 1:
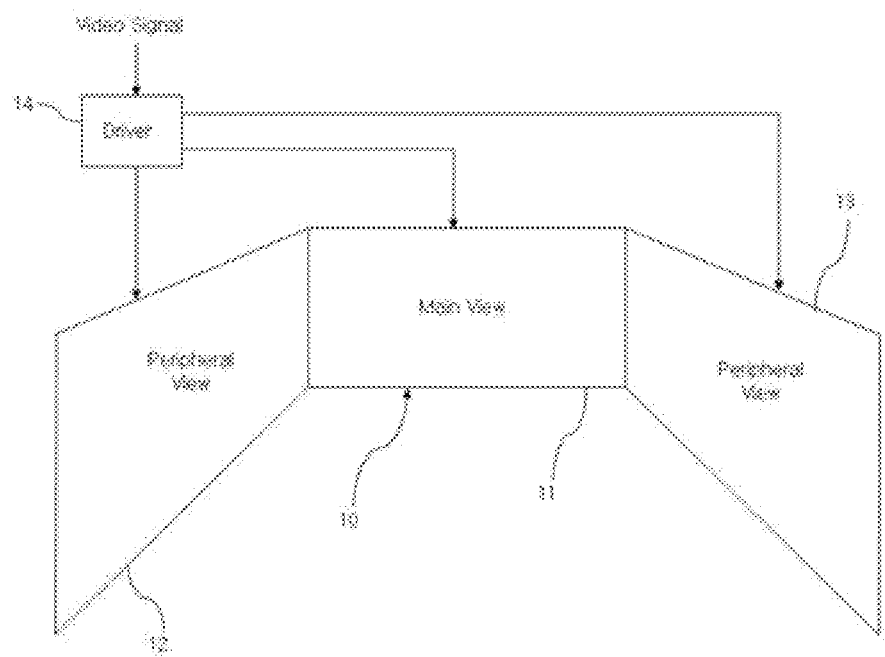
FIGS. 1 to 3 are diagrams for illustrating an immersive display apparatus for creation of a peripheral view image according to the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 2:
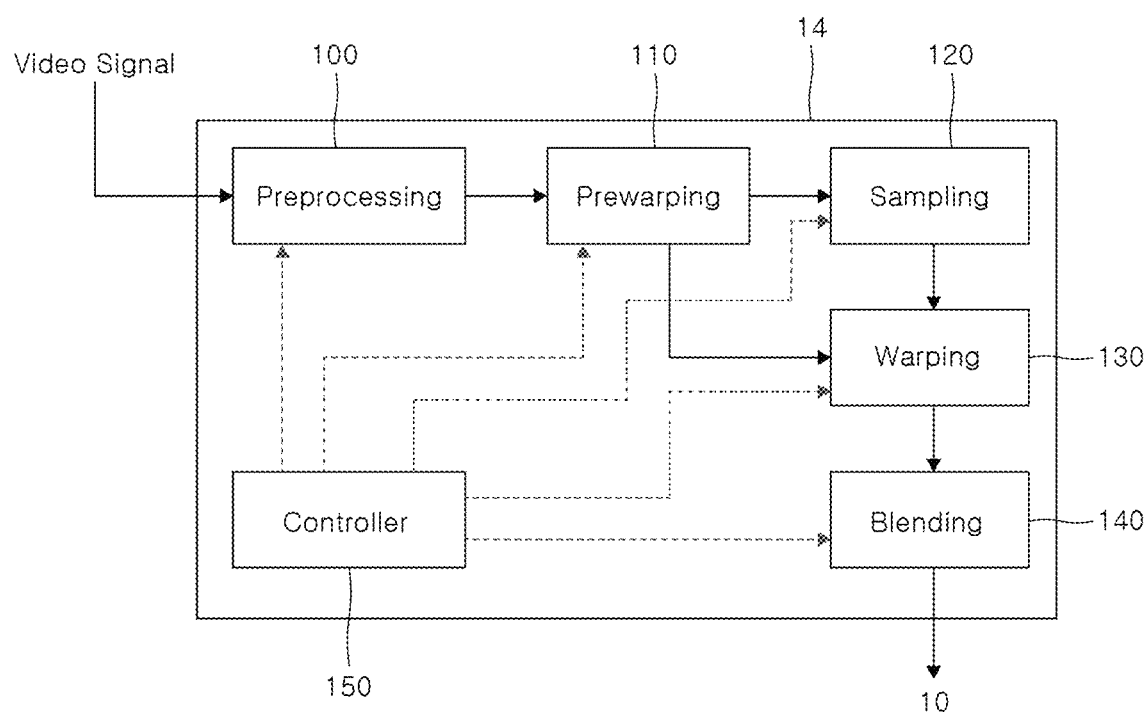
Figure 3:
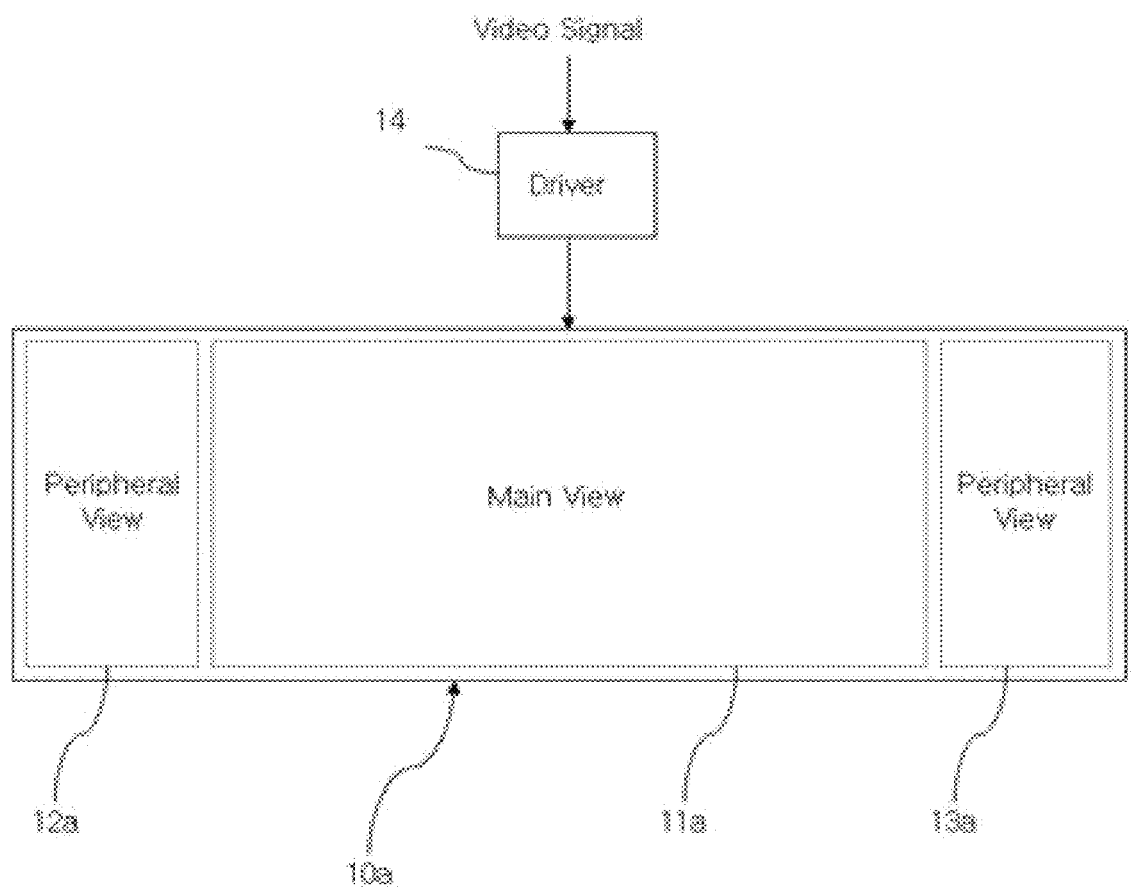

FIGS. 1 to 3 are diagrams for illustrating an immersive display apparatus for creation of a peripheral view image according to the present disclosure.

Referring to FIG. 1, an immersive display apparatus according to the present disclosure may include a display device 10 having a plurality of display parts 11, 12, 13 and a driver 14 for processing an input video signal through a predetermined procedure and supplying the processed signal to the display device 10.

For example, the display device 10 may include a first display part 11 having a first display area and second display parts 12, 13 having a second display area.

A main-view video image may be displayed in the first display area of the first display part 11, and a peripheral view image may be displayed in the second display area of the second display parts 12 and 13.

Considering this, the first display part 11 may be referred to as a main display part, and the second display parts 12 and 13 may be referred to as a peripheral display part.

A video signal corresponding to the first display part 11 may be referred to as a main-view video signal, and a video signal corresponding to the second display part may be referred to as a peripheral view image signal.

The first display part 11 and the second display parts 12 and 13 may be arranged to surround the user. In this case, the user may feel a stronger immersion feeling from the main-view video image displayed on the first display part 11 and the peripheral view image displayed on the second display parts 12 and 13.

A plurality of second display parts 12, 13 may be arranged around the first display part 11. For example, it is possible that the second-1 display part 12 is disposed at the right side of the first display part 11 and the second-2 display part 13 is disposed at the left side of the first display part 11.

Even though FIG. 1 illustrates the case where two auxiliary display parts are arranged around the first display part 11, the present disclosure may not be limited thereto. For example, it is possible that arrange auxiliary display parts are arranged at top, bottom, left, and right sides of the first display part 11, respectively. Alternatively, it is also possible that either the second-1 display part 12 or the second-2 display part 13 is excluded.

The driver 14 may process the input video signal to generate a peripheral view image to be displayed on the second display parts 12 and 13.

As shown in FIG. 2, the driver 14 may include a pre-processing part 100, a pre-warping part 110, a sampling part 120, a warping part 130, a blending part 140, and a controller 150.

The pre-processing part 100 may process the input video signal to obtain scene-space information.

The video signal processed by the pre-processing part 100 may be a video signal corresponding to the first area of the display part 10, namely the first display part 11. If the driver 14 does not generate a peripheral view image, an image is displayed in the first display part 11, but no image may be displayed in the second display parts 12 and 13, corresponding to the input video signal.

The scene-space information obtained by the pre-processing part 100 is information necessary for warping a video signal, and may include scene point information and camera parameter information. Here, the scene point information may be 3D scene point information.

The scene point information and the camera parameter information may be obtained through the structure-from-motion (SFM) technique. The structure-from-motion (SFM) technique is already known in the art and thus not described in detail here.

Here, the scene point information may be information about a portion having predetermined image data on an image.

The pre-warping part 110 may perform first warping to at least one neighborhood frame corresponding to a target frame included in the pro-processed video signal. Here, performing the first warping to the neighborhood frame may be regarded as that the video signal corresponding to the neighborhood frame is primarily warped.

Warping may mean that data about an image is transformed by means of shifting or the like based on information such as parallax of the image.

The pre-warping part 110 may determine an outlier from the result of the first warping.

The method of determining the neighborhood frame and the method of determining the outlier will be explained more clearly in the following description.

The sampling part 120 may sample at least one neighborhood frame to be used for extrapolation from the result of the first warping by the pre-warping part 110. In other words, the sampling part 120 may select at least one neighborhood frame suitable for generating a peripheral view image.

The warping part 130 may perform second warping while excluding the outlier for the sampled frame by the sampling part 120. Here, performing the second warping to the sampled frame may be regarded as that a video signal corresponding to the neighborhood frame selected by the sampling part 120 is secondarily warped.

In addition, the warping part 130 may generate a peripheral view image signal corresponding to a second area around the first area of the display part 10, namely the second display parts 12 and 13, from the result of the second warping.

In other words, the warping part 130 may generate a peripheral view image by warping the sampled frame except for the outlier.

The warping part 130 may obtain information about the outlier from the pre-warping part 110 to perform the second warping.

The blending part 140 may blend the peripheral view image signal generated by the warping part 130 to the main-view video signal.

The display part 10 may display an image corresponding to the video signal blended by the blending part 140 so that the image may be viewed.

The controller 150 may perform overall control functions for image processing and image displaying.

If the pre-processing part 100, the pre-warping part 110, the sampling part 120, the warping part 130 and the blending part 140 perform determination and control functions independently, the controller 150 may be excluded.

The pre-warping part 110 and the warping part 130 may be integrated into a single part in that they perform warping.

Meanwhile, even though it has been described above that the main-view video image is displayed on the first display part 11 and the peripheral view image is displayed on the second display parts 12 and 13 different from the first display part 11, the present disclosure may be not limited thereto.

For example, as shown in FIG. 3, a display part 10a may include a first area 11a included in one screen and second areas 12a and 13a surrounding the first area 11a.

In this case, the main-view video image may be displayed in the first area 11a of the display part 10a and the peripheral view image may be displayed in the second areas 12a, 13a of the display part 10a.

An immersive display method according to the present disclosure, which will be described below, may be applied to various types of display devices.

FIGS. 4 to 18 are diagrams for illustrating an immersive display method for creation of a peripheral view image according to the present disclosure. In the following disclosure, any portion already explained above may not be described again.

Figure 4:
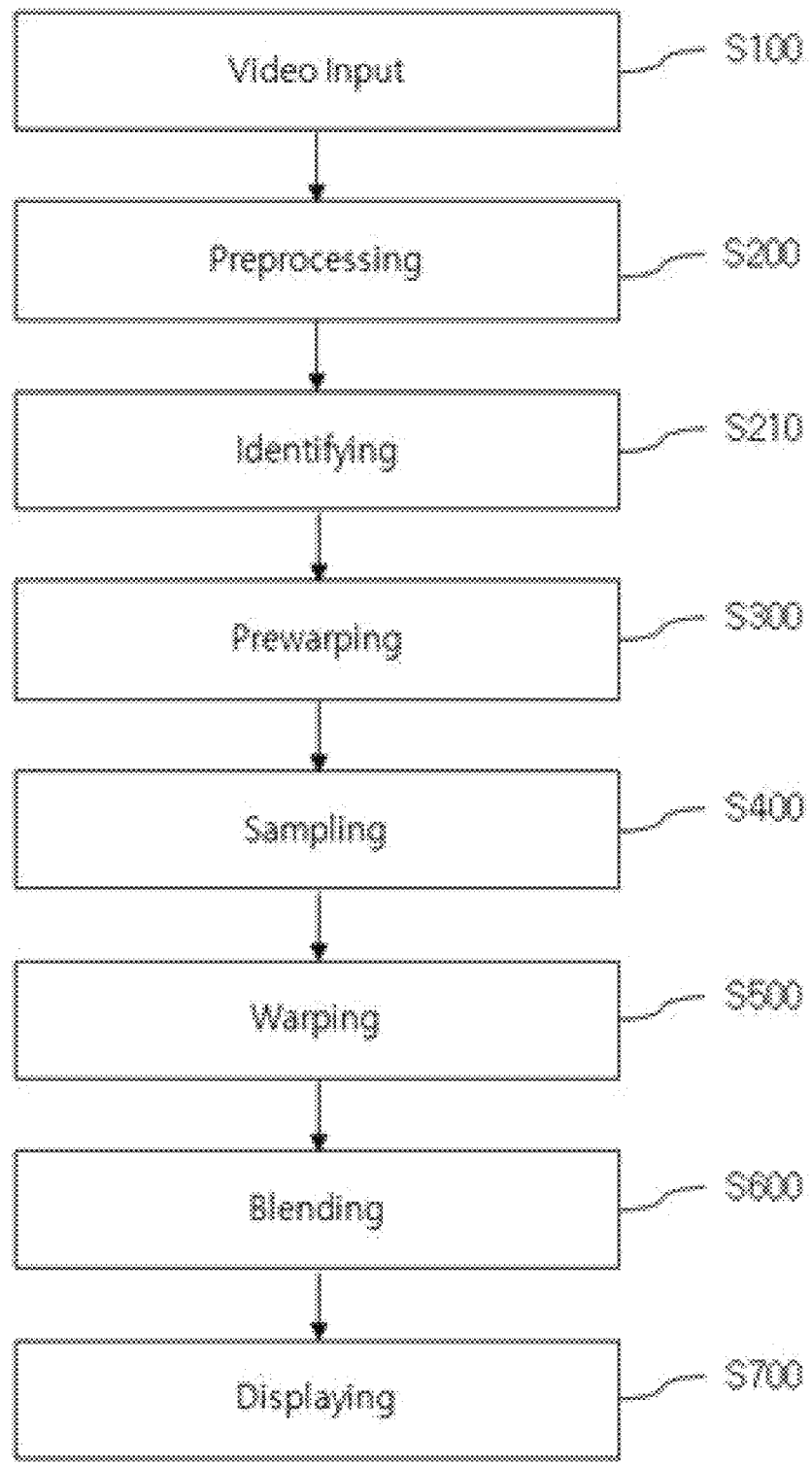

Referring to FIG. 4, in the immersive display method according to the present disclosure, if a main-view video signal corresponding to the first area is input (S100), the input video signal may be pre-processed (S200). By means of this pre-processing process, scene-space information corresponding to the main-view video signal may be obtained.

For example, in the pre-processing step (S200), information about a scene point and information about a camera parameter for each frame included in the video signal may be obtained using the structure-from-motion (SFM) technique.

After that, the neighborhood frame NF corresponding to the target frame TF may be identified (S210). In detail, the neighborhood frame NF corresponding to the target frame TF may be identified based on the scene-space information obtained in the pre-processing step (S200). Here, the neighborhood frame NF may be a frame adjacent to the target frame TF in time.

In addition, the neighborhood frame NF and the target frame TF may be included in the same shot (a single shot).

Considering the above, it is possible to set the target frame TF and the neighborhood frame NF corresponding thereto in a frame group (FG) having a plurality of frames included in the same shot.

Figures 5, 6:
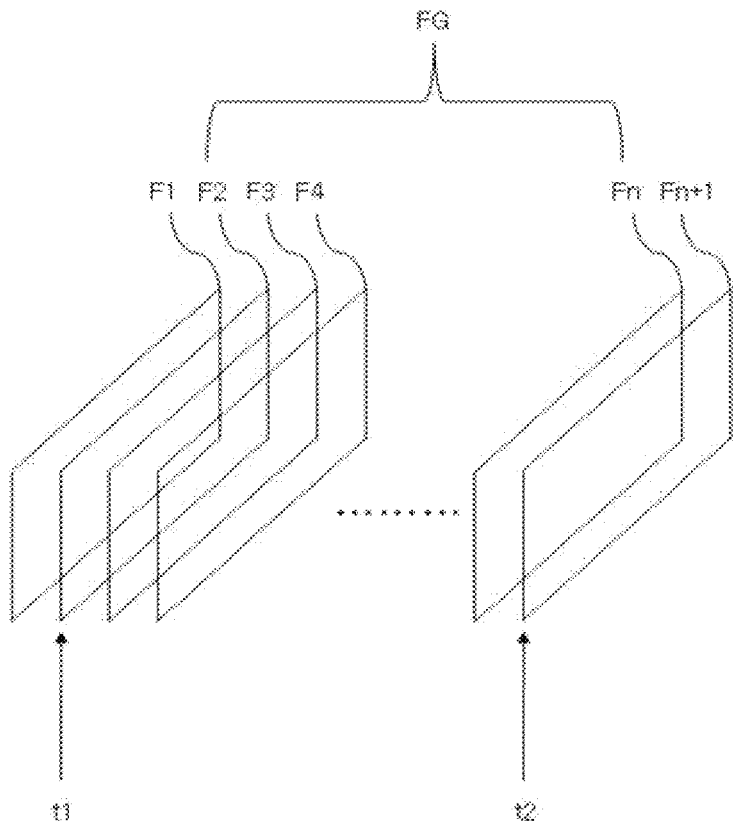

For example, as shown in FIG. 5, it may be assumed that a scene changes at a time t1 between a first frame F1 and a second frame F2, and then a scene changes again at a time t2 between an $n^{th}$ frame Fn and an $n+1^{th}$ frame Fn+1.

In this case, it may be regarded that the second frame F2 to the $n^{th}$ frame Fn are photographed corresponding to the same camera shot. From this, the second frame F2 to the $n^{th}$ frame Fn may be regarded as a frame group FG.

It is possible to set all frames except for the target frame TF in the frame group FG as the neighborhood frame NF. For example, in the case depicted in FIG. 5, if a fourth frame F4 is the target frame TF in the frame group FG, $2^{nd}$-$3^{rd}$ and $5^{th}$-$n^{th}$ frames may be set as neighborhood frames NF of the fourth frame F4, which is the target frame TF.

Alternatively, it is also possible that a frame selected according to a predetermined criterion among the frames in the frame group FG other than the target frame TF is set as the neighborhood frame NF.

As described above, in the case where the neighborhood frame NF corresponding to the target frame TF is set based on a screen change, it is possible to suppress an excessive increase in the amount of data to be processed.

In addition, if the neighborhood frame NF is set corresponding to target frame TF according to the above method, it is possible to sufficiently ensure similarity of image data between the target frame TF and the neighborhood frame NF. In this case, the visual and spatial coherence of the main-view video image and the peripheral view image may be improved.

Each frame included in the frame group FG may be a target frame.

The camera parameter corresponding to at least one neighborhood frame NF may be the same as the camera parameter corresponding to the target frame TF.

After identifying the neighborhood frame NF corresponding to the target frame TF, the first warping (S300) may be performed to the video signal corresponding to the neighborhood frame. For example, the first warping may be performed by transforming image data of the neighborhood frame NF to match the viewpoint of the neighborhood frame NF to the viewpoint of the target frame TF.

The first warping will be described in more detail as follows with reference to FIG. 6.

The first warping may be performed to determine an outlier to be excluded in a following warping step (S500) and to provide a criterion for frame sampling. The outlier may be generated by incompleteness of the structure-from-motion (SFM) technique.

The first warping may be achieved by the content-preserving warping (CPW) Technique using a mesh optimization scheme.

In detail, as shown in FIG. 6, the first warping may be performed in such a way that the sum (Equation 3) of the energy calculated by Equation 1 and the energy calculated by Equation 2 is minimized.

Equations 1, 2, and 3 are described in more detail below.

Equation 1 may mean an energy function for displacement.

In Equation 2, $R_{90}$ may refer to a matrix corresponding to a 90 degree rotation.

v1, v2, v3 denoted by an emphasis point may refer to a warped vertex with a triangle face f.

Equation 3 may mean an energy function according to Equation 2.

Equation 4 may mean the sum of the energy calculated by Equation 1 and the energy calculated by Equation 3.

In Equation 4, σ may mean a spatial smoothness weight.

Assuming that the camera parameter of the $t^{th}$ frame is ct, if m number of scene points are projected on the $t^{th}$ frame using ct, m number of projection points may be generated. Pt={$pt^1$, $pt^2$, . . . , $pt^m$}

In Equation 1, Ptarget may refer to a projection point on the target frame TF. In addition, $P^k$target may mean a $k^{th}$ projection point on the target frame TF.

f($P^k$t) may be a set of indices for vertices including faces with ($P^k$t).

($W_t^j$) may be a barycentric weight of ($P^k$t) with respect to the surrounding vertices.

Here, the projection point Pt may deviate from the field of view (FOV) of the $t^{th}$ frame. In this way, a triangulated grid mesh may be generated and applied to account for the projected point at a position beyond the input frame.

Each frame has an initial grid mesh (V) consisting of {$v^j$}. Here, {$v^j$} may mean a $j^{th}$ grid vertex.

V denoted by an emphasis point may mean a warped mesh consisting of {$v^j$}.

By using Equation 1, the matching of $P^k$target and ($P^k$) may be checked.

In Equation 2, $R_{90}$ may refer to a matrix corresponding to a 90 degree rotation.

($v_t^{f1}$), ($v_t^{f2}$) and ($v_t^{f3}$) denoted by an emphasis point may refer to a vertex having a triangle face f.

u and v which are coordinate information (local coordinate) may be calculated from the initial grid mesh (V).

By using Equation 2, the maintenance of the initial shape of the initial grid mesh (V) may be checked.

Equation 3 may refer to the sum of the energy calculated by Equation 1 and the energy calculated by Equation 2.

In Equation 3, As may mean a spatial smoothness weight.

The first warping may be performed in such a way that the energy calculated by Equation 3 is minimized.

In addition, the first warping may be performed iteratively for each target frame TF.

The method of using the result of the first warping performed in the above manner will be described below with reference to FIG. 7.

Figure 7:
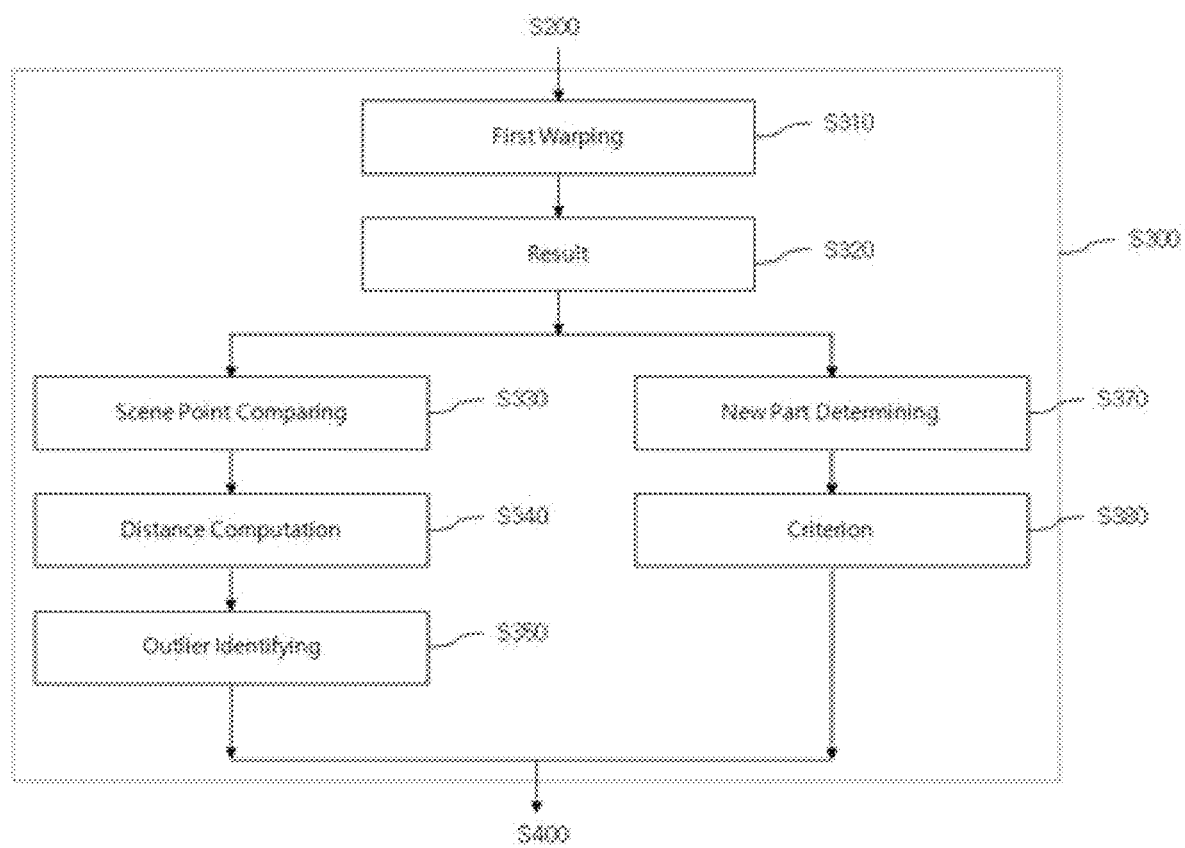

Referring to FIG. 7, in the pre-warping step S300, the first warping may be performed to the input image (S310), and the result of the first warping may be derived (S320).

A warping error may be determined using the result value for the first warping.

For this, it is possible to compare a projection point Ptarget on the target frame TF with a projection point Pt to which an emphasis point corresponding to the warped $t^{th}$ frame is given (S330).

In addition, a distance between Ptarget and Pt to which the emphasis point is given may be computed (S340).

After that, if the distance between Ptarget and Pt to which the emphasis point is given is greater than a predetermined reference distance, the projection point may be determined as an outlier (S350).

As another method for determining an outlier, assuming that a scene point on the neighborhood frame NF corresponding to the first scene point on the target frame TF is a second scene point and a scene point obtained by performing the first warping to the second scene point is a second warping scene point, the second scene point may be determined as an outlier if the distance between the first scene point and the second warping scene point is greater than the preset reference distance.

The outlier determined in this way may be excluded from a following warping step. This will be described in more detail later.

Meanwhile, a sampling criterion required for frame sampling may be extracted using the result of the first warping.

For this, a portion (a peripheral view) newly added corresponding to the target frame TF may be determined using the result of the first warping (S370).

After that, the sampling criterion may be extracted using information about the newly added portion (S380).

After setting the sampling criterion, the neighborhood frame to be warped may be sampled according to the sampling criterion (S400). In other words, at least one neighborhood frame to be used for extrapolation may be sampled from the result of the first warping.

The selected neighborhood frame, or the sampled frame, may mean a frame capable of providing effective data for generating a peripheral view image corresponding to the target frame TF.

In other words, it is possible to sample a frame that contains data suitable (good) for generating a peripheral view image.

The sampling criterion is described in more detail below.

The sampled frame may contain a portion that does not overlap with the target frame.

Figure 8:
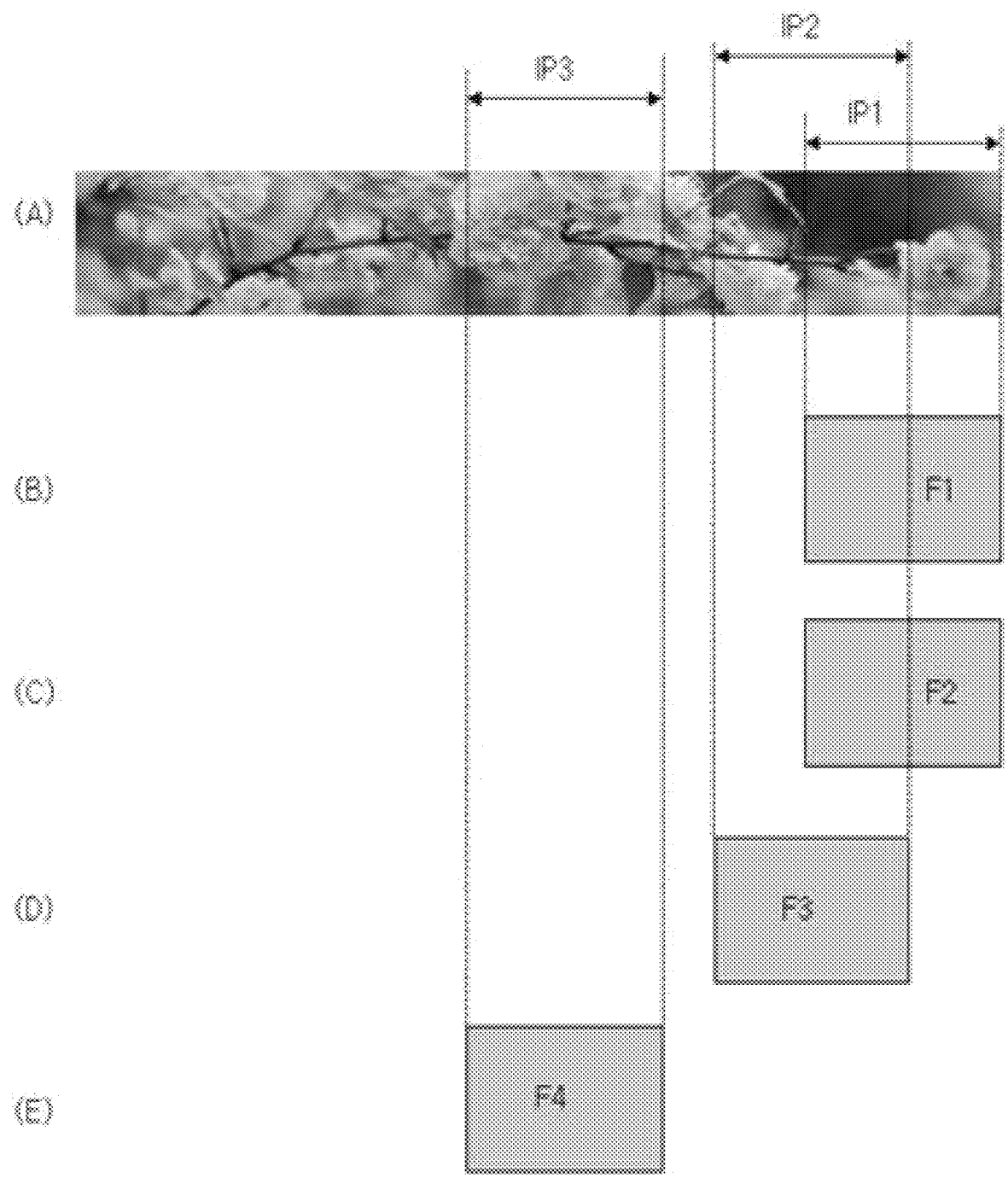
Figure 9:
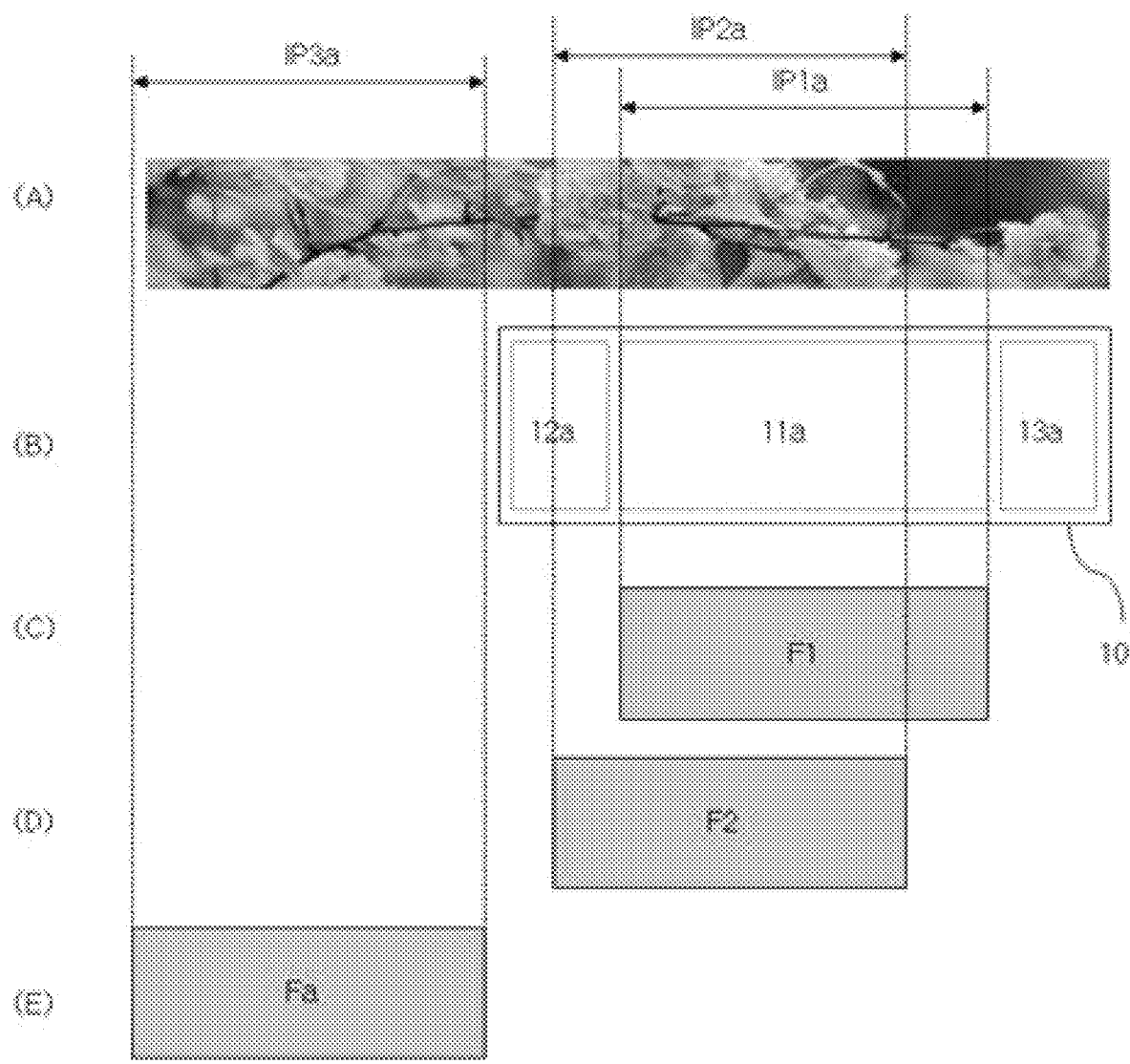

For example, it is assumed that an image as shown in FIG. 8A with one shot. FIG. 8A may be referred to as an image corresponding to one frame group FG. In FIG. 8, the second, third and fourth frames F2, F3, F4 may be neighborhood frames NF of the first frame F1, which is the target frame TF.

As in FIG. 8B, the first frame F1, which is the target frame, may correspond to a first portion IP1 of the entire image A.

As in FIG. 8C, the second frame F2 corresponding to the first portion IP1 of the entire image A, identical to the first frame F1, may not be sampled.

The second frame F2 may not be sampled because the second frame F2 does not contain any information which can be referred to when generating the peripheral view image corresponding to the first frame F1.

It is also possible that the second frame F2 equal to the first frame F1, which is the target frame TF, is set as the sampling frame in order to prevent errors in the following sampling process.

As shown in FIG. 8D, the third frame F3 may correspond to the second portion IP2 of the entire image (A). Here, the second portion IP2 may be partially overlapped with the first portion IP1.

In this case, the third frame F3 may be set as a sampling frame for the first frame F1.

As shown in FIG. 8E, the fourth frame F4 may correspond to the third portion IP3 of the entire image A. Here, the third portion IP3 may not overlap with the first portion IP1.

In this case, the fourth frame F4 may be set as a sampling frame for the first frame F1.

The fourth frame F4 should be sampled because the fourth frame F4 may contain information that can be referred to in generating the peripheral view image corresponding to the first frame F1.

Alternatively, it is also possible that at least one neighborhood frame is sampled considering the size of a peripheral view image to be added to the main-view video image.

For example, it is assumed that the image as in FIG. 9A is photographed with one shot, and the first frame F1 is the target frame.

As shown in FIGS. 9B and 9C, the first frame F1, which is the target frame TF, may correspond to the first area 11$a$ of the display part 10, and the first frame F1 may correspond to the first portion IP1$a$ of the entire image A.

As shown in FIG. 9D, the second frame F2 may correspond to the second portion IP2$a$ of the entire image A. Here, the second portion IP2$a$ may partially overlap with the first portion IP1$a$, and the second portion IP2$a$ may partially overlap with the second areas 12$a$, 13$a$ of the display part 10.

In this case, the second frame F2 may be set as a sampling frame for the first frame F1.

Meanwhile, as shown in FIG. 9E, the third frame F3 may correspond to the third portion IP3$a$ of the entire image A. Here, the third portion IP3$a$ may not overlap with the first portion IP1$a$, and the third portion IP3$a$ may not overlap with the second areas 12$a$, 13$a$ of the display part 10.

In this case, the third frame F3 may not be set as the sampling frame for the first frame F1.

The third frame F3 is not sampled because the third frame F3 does not contain information about the image to be displayed in the second areas 12$a$, 13$a$ of the display part 10.

In another case, it is also possible that at least one neighborhood frame is sampled based on information about the outlier included in the frame.

Figure 10:
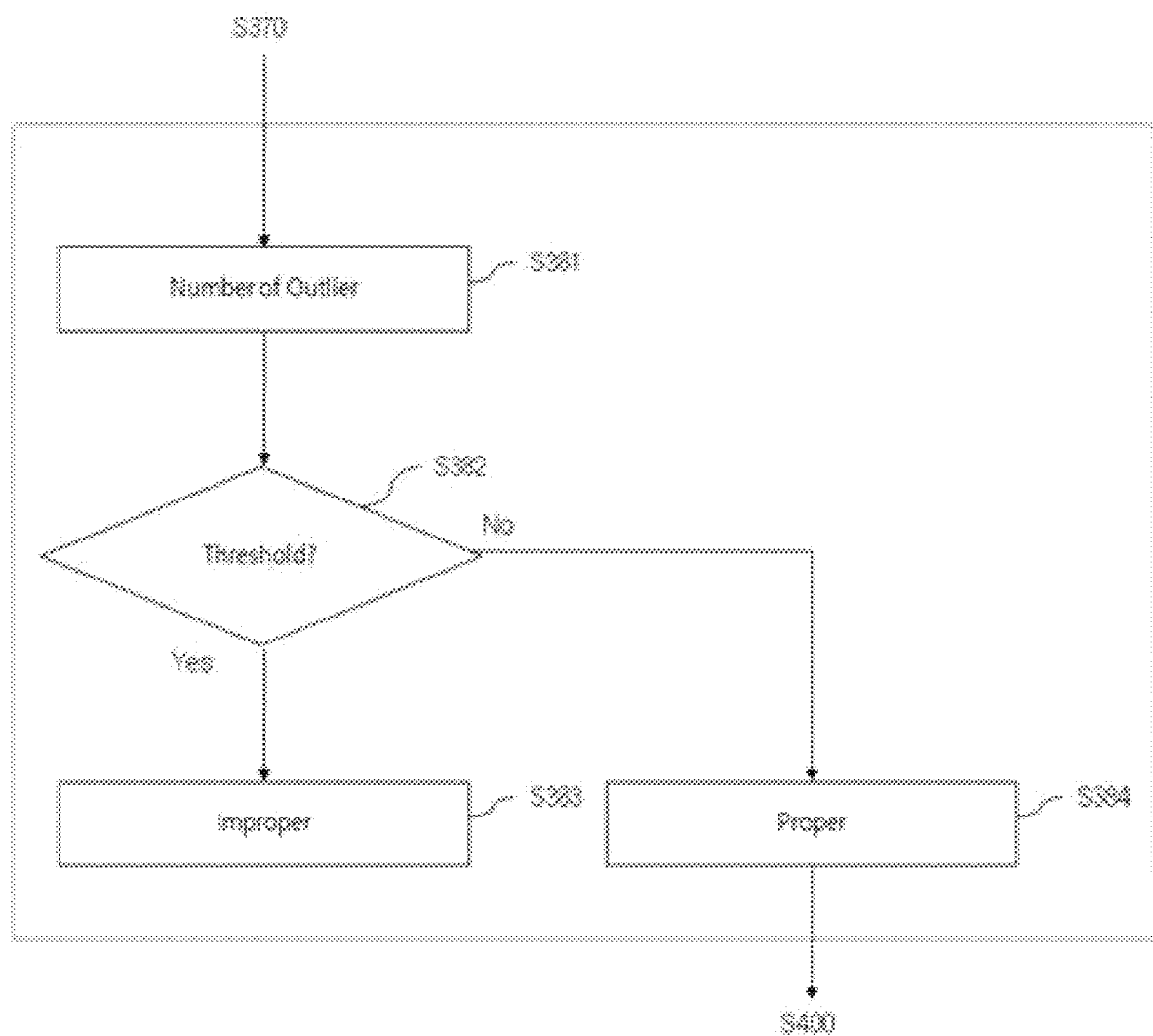
Figure 13:
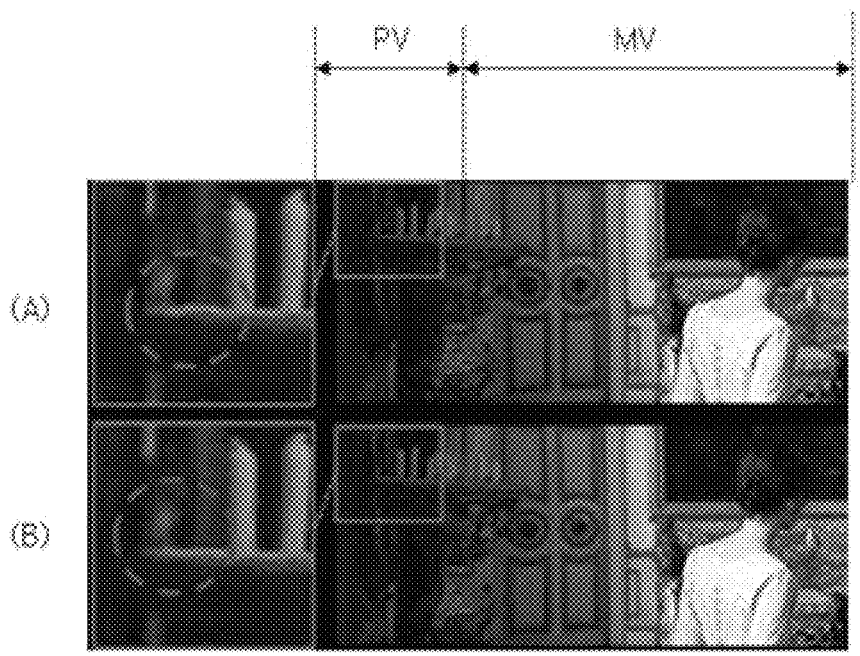
Figure 14:
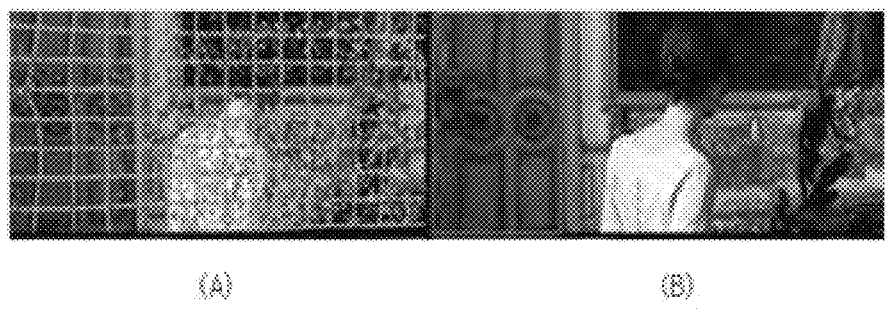
Figure 15:
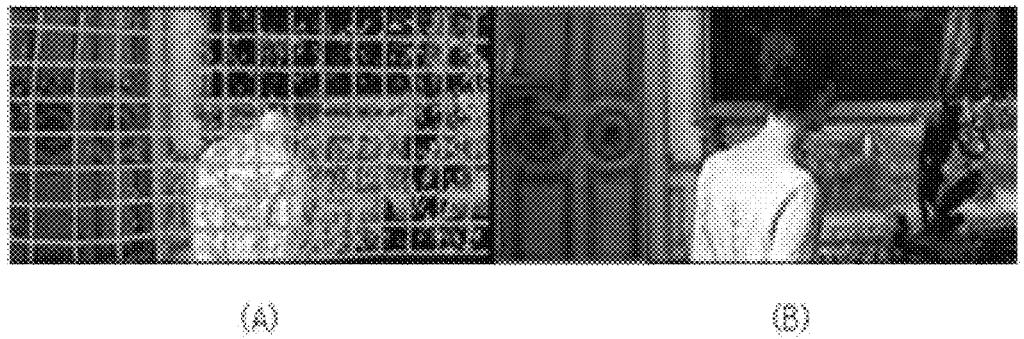
Figure 16:
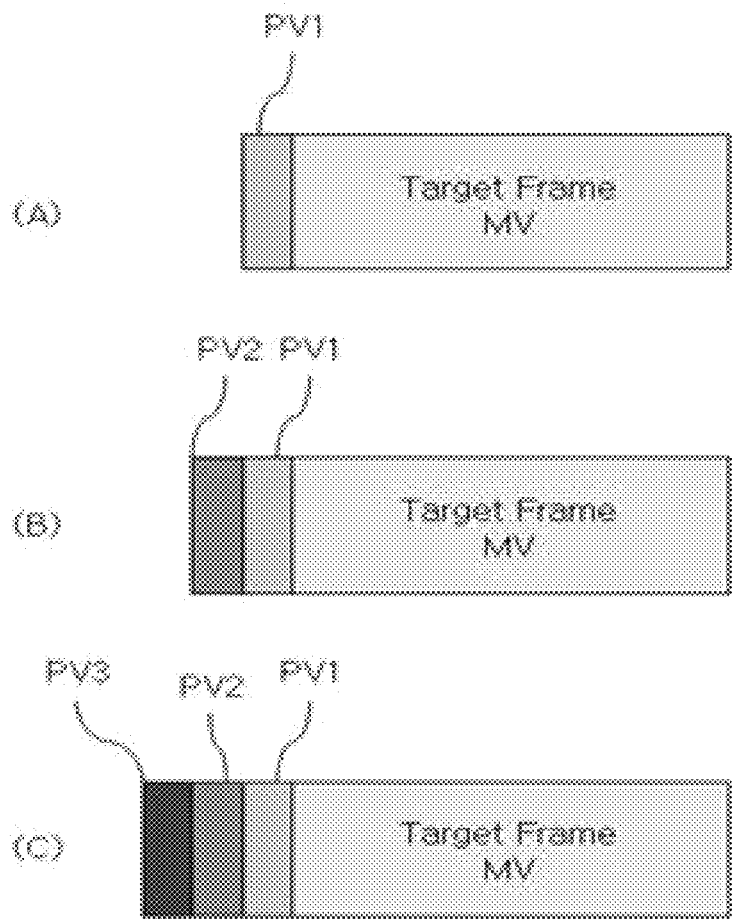

For example, as shown in FIG. 10, information about the number of outliers per frame may be discriminated (S381) from the result of the first warping in the sampling reference setting step S380.

After that, it may be determined whether the number of outliers is greater than a predetermined threshold (S382).

If it is determined that the number of outliers is greater than the threshold, the frame may be set as an improper frame (S383). The improper frame may mean a neighborhood frame that will not be sampled.

Meanwhile, if the number of outliers is smaller than the threshold, the corresponding frame may be set as an appropriate frame suitable for sampling (S384). The reason for the above sampling is that the number of outliers which is relatively small may mean that image distortion is not large.

The method of sampling the neighborhood frame NF to be warped in the present disclosure may not be limited to the above description. For example, it is also possible that a frame to be warped is randomly selected among a plurality of neighborhood frames NF.

Meanwhile, it is also possible that the frame to be sampled is set in the same way for each frame group FG.

For example, as shown in FIG. 11, it is assumed that a first frame group FG1 includes a first frame F1 to an $a^{th}$ frame Fa and a second frame group FG2 includes an $a+1^{th}$ frames Fa+1 to an $n^{th}$ frame Fn.

In this case, the first sampling frame group SFG1 may be set corresponding to the first frame group FG1. In other words, all the neighborhood frames sampled corresponding to the respective target frames included in the first frame group FG1 may be identically set as the first sampling frame group SFG1.

In this case, the amount of data to be processed may be greatly reduced.

After the frame sampling step (S400), second warping may be performed to the video signal corresponding to the sampled frame (S500).

The second warping will be described in more detail as follows with reference to FIG. 12.

In the second warping, the sampling frame may be warped except for the outliers determined in the first warping step (S300).

In detail, as shown in FIG. 12, the second warping may be performed in such a way that the sum (Equation 7) of the energy calculated by Equation 4, the energy calculated by Equation 5 and the energy calculated by Equation 6 is minimized.

Equations 4, 5, 6, and 7 will be described in more detail below. In the following description, the portions described in Equations 1, 2 and 3 may not be described in detail again.

Equation 4 may mean an energy function for inter-frame coherency.

By means of Equation 4, it may be checked whether corresponding scene points are matched.

Equation 5 may mean an energy function for preventing deformation of the original information (original content).

Equation 6 may mean an energy function for temporal consistency.

Equation 7 may mean the sum of the energy calculated by Equation 4, the energy calculated by Equation 5 and the energy calculated by Equation 6.

In Equation 7, $\lambda i$ may mean an inter-frame smoothness weight, $\lambda c$ may mean a temporal smoothness weight, and $\lambda tf$ may mean a target frame constraint weight.

The second warping may be performed in such a way that the energy calculated by Equation 7 is minimized.

In addition, the second warping may be iteratively performed for each target frame TF.

A peripheral view image may be generated by means of the second warping. In other words, a peripheral view image signal corresponding to the second area around the first area may be generated by performing the second warping to the sampled frame, except for the outliers.

As described above, if the second warping is performed so that the energy calculated by Equation 7 is minimized, it is possible to suppress the generation of inter-frame and temporal errors (distortion) of the peripheral view image.

For example, if a warping method not conforming to Equation 7 as shown in FIG. 13A is used, inter-frame distortion may be caused in the peripheral view (PV) image around the main-view (MV) image.

Meanwhile, if a warping method conforming to Equation 7 as shown in FIG. 13B is used, it is possible to suppress the occurrence of inter-frame distortion in the peripheral view (PV) image.

In the warping process, it is possible to suppress the distortion of the peripheral view image by warping except for the outliers. This will be described below with reference to FIGS. 14 and 15.

FIG. 14A shows outliers and inliers.

The outliers are marked with red dots, and the inliers are marked with green dots. Here, the outliers may correspond to a portion having a relatively high possibility of image distortion, and the inliers may correspond to a portion having a relatively low possibility of generating image distortion in comparison with the outliers.

If the second warping is performed without excluding the outliers and then the peripheral view image is generated as a result of the second warping, as shown in the purple box of FIG. 14B, distortion may occur in the peripheral view image.

Meanwhile, if the second warping is performed except for the outliers as shown in FIG. 15A, it is possible to suppress the distortion in the peripheral view image as shown in FIG. 15B.

If FIG. 15A is compared with FIG. 14A, it may be found that the red dots are disappeared (controlled) on the screen.

After the second warping is performed to the sampled frame except for the outlier, the peripheral view image generated by the second warping may be blended to the main-view video image (S600). In other words, the peripheral view image signal may be blended to the main-view video signal.

In this blending step, the peripheral view image signal may be blended to the main-view video signal in the order closer to the main-view video image corresponding to the target frame TF.

For example, as shown in FIGS. 16A, 16B and 16C, it is possible that a first peripheral view (PV1) image closest to the main-view (MV) image is blended, then a second peripheral view (PV2) image is blended to the first peripheral view (PV1) image, and then a third peripheral view (PV3) image is blended to the second peripheral view (PV2) image.

Meanwhile, it is also possible that the peripheral view image is blended to the main-view video image in a plurality of directions.

Figure 17:
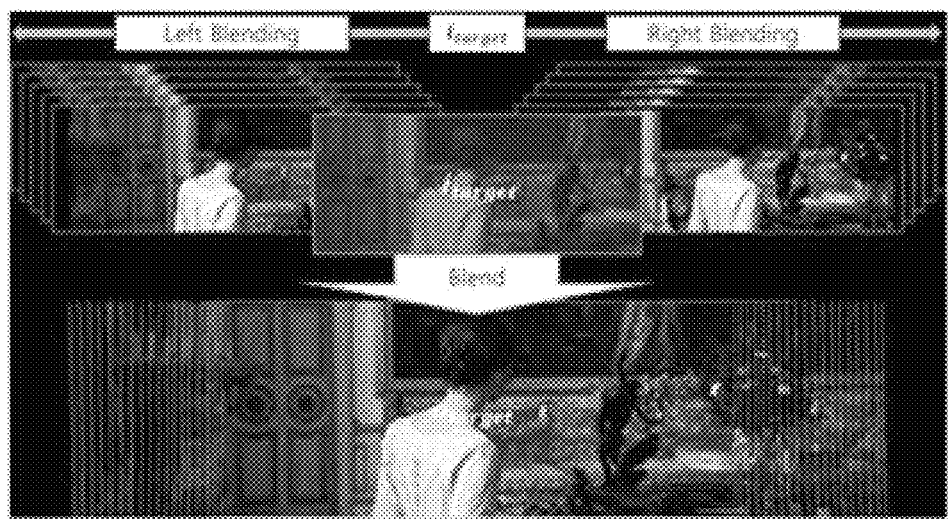

For example, as shown in FIG. 17, it is possible that the peripheral view image is blended in a left direction of the target frame corresponding to the target frame and also the peripheral view image is blended in a right direction of the target frame.

Figure 18:
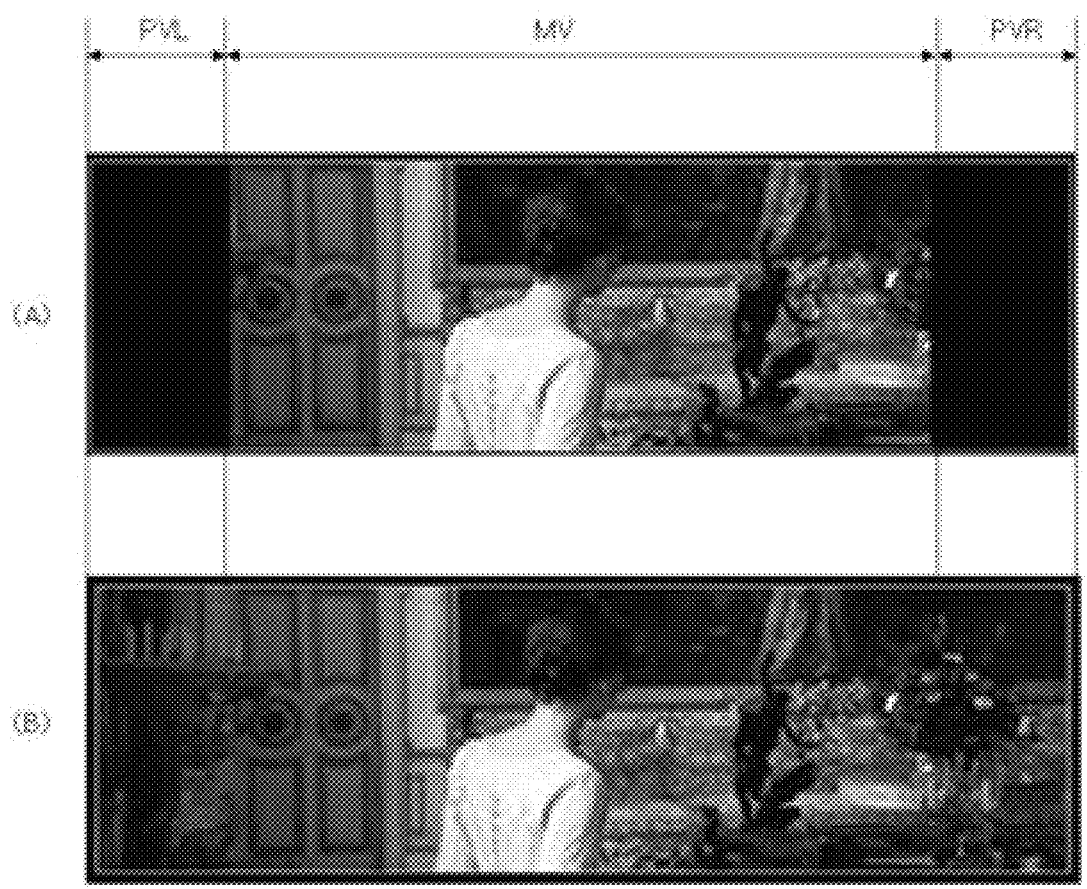

FIG. 18 shows an example in which a peripheral view image is generated according to the method of the present disclosure, and the generated peripheral view image is blended to the main view video image and displayed.

FIG. 18A may be a main-view video image as a video corresponding to the video signal input to the driver 14.

FIG. 18B may be an image obtained by generating a peripheral view image (PVL, PVR) by the driver 14 according to the method of the present disclosure and then blending the image with the main-view video image. This image may be referred to as an immersive video.

In the present disclosure, since a video signal corresponding to the peripheral view is generated based on the video signal corresponding to the main-view, the resolution corresponding to the main-view video signal and the resolution corresponding to the peripheral view image signal may be the same. Thus, the quality of the immersive image may be improved.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An immersive display method for creation of a peripheral view image corresponding to an input video, comprising:
   a pre-processing step of obtaining scene-space information at a main-view video signal corresponding to a first area;
   a pre-warping step of performing first warping to at least one neighborhood frame corresponding to a target frame included in a pre-processed video signal and determining an outlier from the result of the first warping;
   a sampling step of sampling at least one neighborhood frame to be used for extrapolation from the result of the first warping;
   a warping step of performing second warping to the sampled frame except for the outlier to generate a peripheral view image signal corresponding to a second area around the first area; and
   a blending step of blending the peripheral view image signal to the main-view video signal,
   wherein the first warping is performed by Equations (1)-(3),

| Prewarping |
|---|
| (1) $E_d = \sum_k \left\| \sum_{j \in f(p_t^k)} w_t^j \hat{v}_t^j - p_{target}^k \right\|^2$ |
| (2) $E_s = \sum_f \left\| \hat{v}_t^{f1} - (\hat{v}_t^{f2} + u(\hat{v}_t^{f3} - \hat{v}_t^{f2}) + vR_{90}(\hat{v}_t^{f3} - \hat{v}_t^{f2})) \right\|^2$ |
| (3) $\underset{\hat{v}_t}{\operatorname{argmin}} E_d + \lambda_s E_s$ | wherein the first warping is performed so that the sum (Equation (3)) of the energy calculated by Equation (1) and the energy calculated by Equation (2) is minimized,
   wherein in Equation (1), $P^k{}_{target}$ refers to a $k^{th}$ projection point on the target frame TF, $f(P^k t)$ refers to a set of indices for vertices including faces with ($P^k t$), $W_t^j$ refers to a barycentric weight of ($P^k t$) with respect to the surrounding vertices, $\{v^j\}$ refers to a $j^{th}$ grid vertex,
   wherein in Equation (2), $R_{90}$ refers to a matrix corresponding to a 90 degree rotation, $(v_t^{f1})$, $(v_t^{f2})$ and $(v_t^{f3})$ denoted by an emphasis point refer to a vertex having a triangle face f, wherein u and v, which are coordinate information (local coordinate), are calculated from an initial grid mesh,
   wherein in Equation (3), $\lambda_s$ refers to a spatial smoothness weight,
   wherein the second warping is performed by Equations (4)-(7),

| Warping |
|---|
| (4) $E_i = \sum_k \left\| \sum_{j \in f(p_t^k)} w_t^j \hat{v}_t^j - \sum_{j \in f(p_{t-1}^k)} w_{t-1}^j \hat{v}_{t-1}^j \right\|^2$ |
| (5) $E_{tf} = \left\| \sum_{\hat{v}^j \in \hat{v}_{target}} \hat{v}^j - v^j \right\|^2$ |
| (6) $E_c = \sum_f \left\| \hat{v}_t^{f1} - (\hat{v}_t^{f2} + \tilde{u}(\hat{v}_t^{f3} - \hat{v}_t^{f2}) + \tilde{v}R_{90}(\hat{v}_t^{f3} - \hat{v}_t^{f2})) \right\|^2$ |
| (7) $\underset{\hat{v}_t}{\operatorname{argmin}} \sum_{t \in I''} E_d + \lambda_s E_s + \lambda_i E_i + \lambda_{tf} E_{tf} + \lambda_c E_c$ | wherein the second warping is performed so that the sum (Equation (7)) of the energy calculated by Equation (4), the energy calculated by Equation (5) and the energy calculated by Equation (6) is minimized,
   wherein Equation (4) refers to an energy function for inter-frame coherency, wherein Equation (5) refers to an energy function for preventing deformation of original information, wherein Equation (6) refers to an energy function for temporal consistency, wherein Equation (7) refers to the sum of the energy calculated by Equation (4), the energy calculated by Equation (5) and the energy calculated by Equation (6),
   wherein in Equation (7), $\lambda i$ refers to an inter-frame smoothness weight, $\lambda c$ refers to a temporal smoothness weight, and $\lambda tf$ refers to a target frame constraint weight, and
   wherein in Equation (6), the local coordinates $\tilde{u}$ and $\tilde{v}$ are computed from a warped mesh of a t-th frame for a previous target frame.

2. The immersive display method of claim 1, wherein the scene-space information includes scene point information and camera parameter information, wherein the scene point information and the camera parameter information may be obtained through structure-from-motion (SFM) technique.

3. The immersive display method of claim 2, wherein the neighborhood frame and the target frame are included in the same shot.

4. The immersive display method of claim 3, wherein frames sampled corresponding to all target frames of a frame group included in the same shot are identical to each other.

5. The immersive display method of claim 4, wherein the method is repeated for each frame included in the frame group as the target frame.

6. The immersive display method of claim 2, wherein a scene point on the neighborhood frame corresponding to a first scene point on the target frame is called a second scene point and a scene point obtained by performing the first warping to the second scene point is a second warping scene point, in the pre-warping step, the second scene point is set as an outlier when a distance between the first scene point and the second warping scene point is greater than a preset reference distance.

7. The immersive display method of claim 1, wherein the sampled frame includes a portion not overlapping with the target frame.

8. The immersive display method of claim 1, wherein in the blending step, the peripheral view image signal is blended to the main-view video signal in the order closer to the main-view video image with respect to the target frame.

9. The immersive display method of claim 1, wherein a resolution corresponding to the main-view video signal is identical to a resolution corresponding to the peripheral view image signal.

10. An immersive display apparatus for creation of a peripheral view image corresponding to an input video, comprising:
- a display part that displays an image;
- a pre-processing part that obtains scene-space information from a main-view video signal corresponding to a first area of the display part;
- a pre-warping part that performs first warping to at least one neighborhood frame corresponding to a target frame included in a video signal pre-processed by the pre-processing part and determine an outlier from the result of the first warping;
- a sampling part that samples at least one neighborhood frame to be used for extrapolation from the result of the first warping;
- a warping part that performs second warping to the sampled frame except for the outlier to generate a peripheral view image signal corresponding to a second area around the first area of the display part; and
- a blending part that blends the peripheral view image signal to the main-view video signal, wherein the first warping is performed by Equations (1)-(3), Prewarping (1) $$E_d = \sum_k \left\| \sum_{j \in f(p_t^k)} w_t^j \hat{v}_t^j - p_{target}^k \right\|^2$$

(2) $$E_s = \sum_f \left\| \hat{v}_t^{f1} - \left( \hat{v}_t^{f2} + u(\hat{v}_t^{f3} - \hat{v}_t^{f2}) + v R_{90}(\hat{v}_t^{f3} - \hat{v}_t^{f2}) \right) \right\|^2$$

(3) $$\operatorname*{argmin}_{\hat{v}_t} E_d + \lambda_s E_s$$

wherein the first warping is performed so that the sum (Equation (3)) of the energy calculated by Equation (1) and the energy calculated by Equation (2) is minimized, wherein in Equation (1), $P^k{}_{target}$ refers to a $k^{th}$ projection point on the target frame TF, $f(P^k t)$ refers to a set of indices for vertices including faces with ($P^k t$), $W_t^j$ refers to a barycentric weight of ($P^k t$) with respect to the surrounding vertices, $\{v^j\}$ refers to a $j^{th}$ grid vertex, wherein in Equation (2), $R_{90}$ refers to a matrix corresponding to a 90 degree rotation, ($v_t^{f1}$), ($v_t^{f2}$) and ($v_t^{f3}$) denoted by an emphasis point refer to a vertex having a triangle face f, wherein u and v, which are coordinate information (local coordinate), are calculated from an initial grid mesh, wherein in Equation (3), $\lambda_s$ refers to a spatial smoothness weight, wherein the second warping is performed by Equations (4)-(7), Warping (4) $$E_i = \sum_k \left\| \sum_{j \in f(p_t^k)} w_t^j \hat{v}_t^j - \sum_{j \in f(p_{t-1}^k)} w_{t-1}^j \hat{v}_{t-1}^j \right\|^2$$

(5) $$E_{tf} = \left\| \sum_{\hat{v}^j \in \hat{v}_{target}} \hat{v}^j - v^j \right\|^2$$

Warping (6) $$E_c = \sum_f \left\| \hat{v}_t^{f1} - \left( \hat{v}_t^{f2} + \tilde{u}(\hat{v}_t^{f3} - \hat{v}_t^{f2}) + \tilde{v} R_{90}(\hat{v}_t^{f3} - \hat{v}_t^{f2}) \right) \right\|^2$$

(7) $$\operatorname*{argmin}_{\hat{v}_t} \sum_{t \in I''} E_d + \lambda_s E_s + \lambda_i E_i + \lambda_{tf} E_{tf} + \lambda_c E_c$$

wherein the second warping is performed so that the sum (Equation (7)) of the energy calculated by Equation (4), the energy calculated by Equation (5) and the energy calculated by Equation (6) is minimized, wherein Equation (4) refers to an energy function for inter-frame coherency, wherein Equation (5) refers to an energy function for preventing deformation of original information, wherein Equation (6) refers to an energy function for temporal consistency, wherein Equation (7) refers to the sum of the energy calculated by Equation (4), the energy calculated by Equation (5) and the energy calculated by Equation (6), wherein in Equation (7), $\lambda i$ refers to an inter-frame smoothness weight, $\lambda c$ refers to a temporal smoothness weight, and $\lambda tf$ refers to a target frame constraint weight, and wherein in Equation (6), the local coordinates $\tilde{u}$ and $\tilde{v}$ are computed from a warped mesh of a t-th frame for a previous target frame.

11. The immersive display apparatus of claim 10, wherein the scene-space information includes scene point information and camera parameter information, wherein the scene point information and the camera parameter information may be obtained through structure-from-motion (SFM) technique.

12. The immersive display apparatus of claim 11, wherein the neighborhood frame and the target frame are included in the same shot.

13. The immersive display apparatus of claim 12, wherein frames sampled corresponding to all target frames of a frame group, which has a plurality of frames, included in the same shot are identical to each other.

14. The immersive display apparatus of claim 13, wherein the method is repeated for each frame included in the frame group as the target frame.

15. The immersive display apparatus of claim 11, wherein a scene point on the neighborhood frame corresponding to a first scene point on the target frame is called a second scene point and a scene point obtained by performing the first warping to the second scene point is a second warping scene point, the pre-warping part sets the second scene point as an outlier when a distance between the first scene point and the second warping scene point is greater than a preset reference distance.

16. The immersive display apparatus of claim 10, wherein the sampled frame includes a portion not overlapping with the target frame.

17. The immersive display apparatus of claim 10, wherein the blending part blends the peripheral view image signal to the main-view video signal in the order closer to the main-view video image with respect to the target frame.

18. The immersive display apparatus of claim 10, wherein a resolution corresponding to the main-view video signal is identical to a resolution corresponding to the peripheral view image signal.

19. An immersive display apparatus for creation of a peripheral view image corresponding to an input video, comprising:
a first display part including a first display area;
a second display part including a second display area;
a pre-processing part that obtains scene-space information from a main-view video signal corresponding to the first display part;
a pre-warping part that performs first warping to at least one neighborhood frame corresponding to a target frame included in a video signal pre-processed by the pre-processing part and determine an outlier from the result of the first warping;
a sampling part that samples at least one neighborhood frame to be used for extrapolation from the result of the first warping;
a warping part that performs second warping to the sampled frame except for the outlier to generate a peripheral view image signal corresponding to the second display part; and
a blending part that blends the peripheral view image signal to the main-view video signal,
wherein the first warping is performed by Equations (1)-(3),

| Prewarping |
| --- |
| (1) $E_d = \sum_k \left\| \sum_{j \in f(p_t^k)} w_t^j \hat{v}_t^j - p_{target}^k \right\|^2$ |
| (2) $E_s = \sum_f \left\| \hat{v}_t^{f1} - \left( \hat{v}_t^{f2} + u(\hat{v}_t^{f3} - \hat{v}_t^{f2}) + vR_{90}(\hat{v}_t^{f3} - \hat{v}_t^{f2}) \right) \right\|^2$ |
| (3) $\operatorname*{argmin}_{\hat{v}_t} E_d + \lambda_s E_s$ | wherein the first warping is performed so that the sum (Equation (3)) of the energy calculated by Equation (1) and the energy calculated by Equation (2) is minimized,
wherein in Equation (1), $P^k_{target}$ refers to a $k^{th}$ projection point on the target frame TF, $f(P^k t)$ refers to a set of indices for vertices including faces with $(P^k t)$, $W_t^j$ refers to a barycentric weight of $(P^k t)$ with respect to the surrounding vertices, $\{v^j\}$ refers to a $j^{th}$ grid vertex,
wherein in Equation (2), $R_{90}$ refers to a matrix corresponding to a 90 degree rotation, $(v_t^{f1})$, $(v_t^{f2})$ and $(v_t^{f3})$ denoted by an emphasis point refer to a vertex having a triangle face f, wherein u and v, which are coordinate information (local coordinate), are calculated from an initial grid mesh,
wherein in Equation (3), λs refers to a spatial smoothness weight,
wherein the second warping is performed by Equations (4)-(7),

| Warping |
| --- |
| (4) $E_i = \sum_k \left\| \sum_{j \in f(p_t^k)} w_t^j \hat{v}_t^j - \sum_{j \in f(p_{t-1}^k)} w_{t-1}^j \hat{v}_{t-1}^j \right\|^2$ |
| (5) $E_{tf} = \left\| \sum_{\hat{v}^j \in \hat{V}_{target}} \hat{v}^j - v^j \right\|^2$ |
| (6) $E_c = \sum_f \left\| \hat{v}_t^{f1} - \left( \hat{v}_t^{f2} + \tilde{u}(\hat{v}_t^{f3} - \hat{v}_t^{f2}) + \tilde{v} R_{90}(\hat{v}_t^{f3} - \hat{v}_t^{f2}) \right) \right\|^2$ |
| (7) $\operatorname*{argmin}_{\hat{v}_t} \sum_{t \in I''} E_d + \lambda_s E_s + \lambda_i E_i + \lambda_{tf} E_{tf} + \lambda_c E_c$ | wherein the second warping is performed so that the sum (Equation (7)) of the energy calculated by Equation (4), the energy calculated by Equation (5) and the energy calculated by Equation (6) is minimized,
wherein Equation (4) refers to an energy function for inter-frame coherency, wherein Equation (5) refers to an energy function for preventing deformation of original information, wherein Equation (6) refers to an energy function for temporal consistency, wherein Equation (7) refers to the sum of the energy calculated by Equation (4), the energy calculated by Equation (5) and the energy calculated by Equation (6),
wherein in Equation (7), λi refers to an inter-frame smoothness weight, λc refers to a temporal smoothness weight, and λtf refers to a target frame constraint weight, and
wherein in Equation (6), the local coordinates ũ and ṽ are computed from a warped mesh of a t-th frame for a previous target frame.

20. The immersive display apparatus of claim 19, wherein the scene-space information includes scene point information and camera parameter information, wherein the scene point information and the camera parameter information may be obtained through structure-from-motion (SFM) technique.

* * * * *